Jan. 9, 1968  J. E. GOLDRING  3,362,106
SEED PACKAGE AND FARMING METHODS
Filed Dec. 13, 1965  2 Sheets-Sheet 1
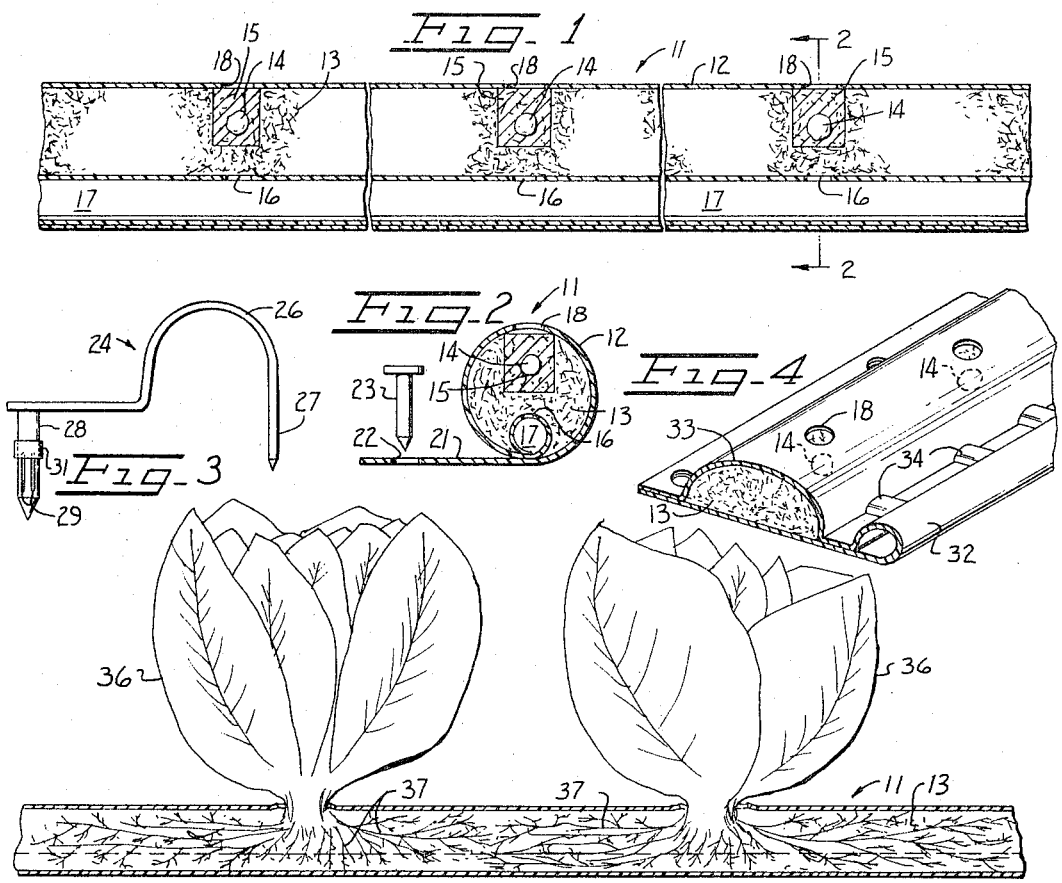
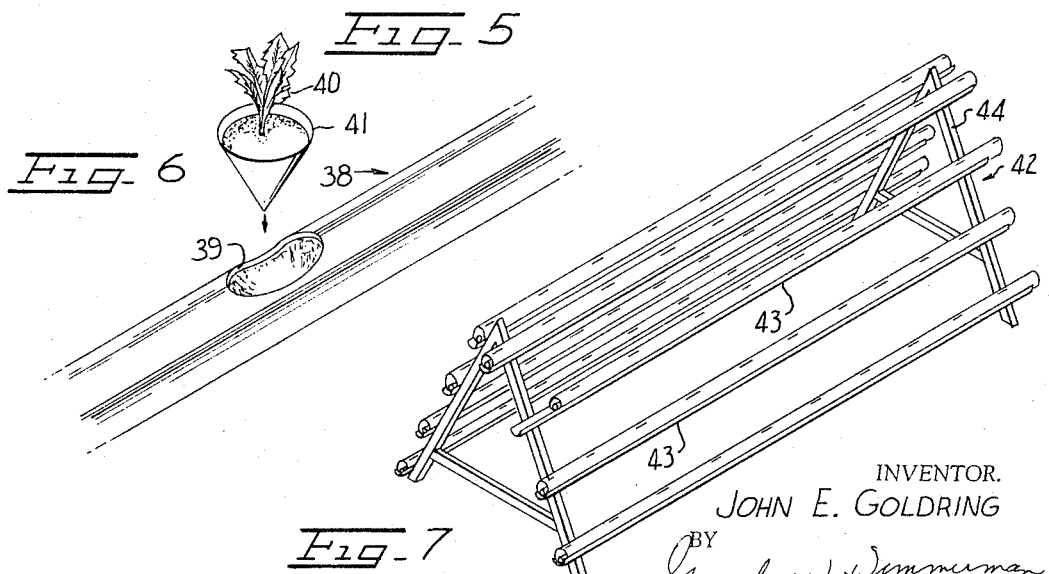
INVENTOR.
JOHN E. GOLDRING
BY
Gardner + Zimmerman
ATTORNEYS

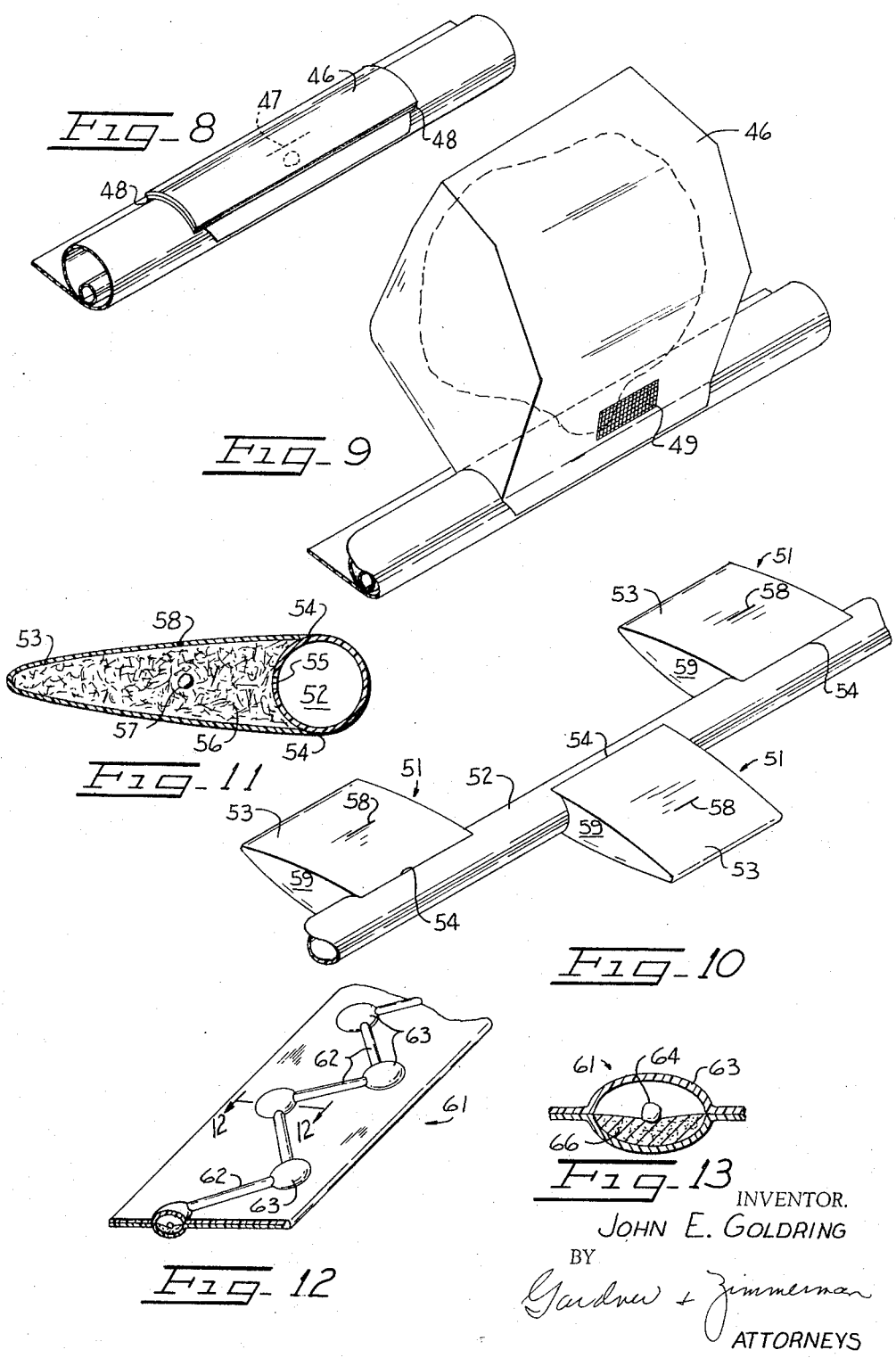

3,362,106
SEED PACKAGE AND FARMING METHODS
John E. Goldring, P.O. Box 1013,
Pebble Beach, Calif. 93953
Filed Dec. 13, 1965, Ser. No. 513,289
7 Claims. (Cl. 47—56)

The present invention relates to agricultural implements and farming methods. More particularly, the present invention appertains to a seed package containing plant life support material, including plant nutrients, and irrigating means for raising mature plants and cash crops from seeds and seedlings. The invention further relates to "planting," cultivating, and harvesting methods employing the present seed package.

While man has made great strides in furthering science and technology in general, the field of agriculture is one in which no basic change has occurred since ancient times. The farmer still raises his crops principally by laboring manually from dawn to dusk. The tractor, a by-product of man's desire for mobility, has somewhat eased the farmer's tasks, but no basic change has been made in the approach to farming. The farmer still cultivates his fields, plants his seeds in the earth, fertilizes, irrigates and weeds, and then finally harvests those plants which attain maturity.

Attempts have been made to improve the approach to planting and harvesting. For example, seeds and seedlings have been attached to or secured within carriers such as tapes, cords, woven tubular jackets, etc., which are buried in the ground. These carriers are stored on reels or drums and are planted by means of machinery which buries a carrier in the soil as it is dispensed from the reel. Some seed carriers are made of durable materials which allow harvesting of the grown plants by simply pulling up the carrier together with the mature plants which become firmly attached thereto because the plant roots intertwine with the carrier. Nevertheless, these seed planting and harvesting methods have not been accepted by the farmer because of the great number of seeds planted in this manner which generally never reach maturity. The farmer would rather indiscriminately plant a great multitude of seeds in the hope that by doing so an adequate number of plants will reach maturity.

The present invention presents an approach to farming which is totally different from any heretofore and is a substantial simplification and improvement over conventional methods. It dispenses with a variety of operations and prerequisites ordinarily involved in the cultivation of plants and affords substantial control over plant growth. Accordingly, the present invention affords significant economic savings and advantages.

Briefly, the invention provides a seed package which is a self-contained system for supplying a complete, preselected nutritional environment to sustain and control the growth of seeds into mature plants under optimum conditions. The seed package includes an integral irrigation system capable of supplying water and fertilizer solutions directly and selectively to each plant at uniform rates. This allows maximum water economy and simultaneously optimum growth rates.

The seed package of the invention basically comprises an outer flexible envelope of a durable material which contains a plant life support material including plant nutrients. The seeds or seedlings are imbedded in the life support material at predetermined intervals along the envelope. If it is seeds in the envelope, the envelope is perforated adjacent each seed to allow the maturing plants to escape from the interior of the envelope. The envelope also incorporates a conduit communicating with the location of each seed or seedling for selectively providing water and liquid fertilizers to each individual seed or seedling. The liquid conduit is usually connected to a central water storage and delivery system.

One of the principal advantages of the present seed package, and farming systems based on its use, is the complete independence from soils and soil conditions. Thus, farming can be carried on in areas not otherwise suitable for cultivating. In fact, the present invention does not depend on the earth for support of the plant growth. The seed tube network may even be disposed on floating rafts, which can be anchored off-shore in quiet coastal waters, an innovation of considerable importance to East and Southeast Asian island nations, for example, which are plagued by high population densities and large areas of mountainous or jungle covered terrain unsuitable for farming. The tube may also be disposed on inclined racks for greenhouse and outdoor farming applications where space is at a premium.

Another of the principal advantages of the invention is that with it, complete control can be maintained over the growth of the plants. The original nurtrients provided around each seed or seedling can be preselected both as to type and quantity to control germination and later growth of the seed, and the liquid conduit allows controlled irrigation and additional fertilization of the individual plants during growth. Furthermore, great savings in irrigating water and fertilizers can be achieved since they are directed only to the vicinity of the plants. Moreover, by appropriately choosing the material for the seed envelope, it and its contents can be ground or otherwise comminuted after the plants have been harvested to be utilized as a life support material for additional envelopes.

A further modification and refinement of the present invention provides complete enclosure of the maturing plants exterior to the tube. Light transmissive, expandable bags are attached to the envelope over each aperture through which the plants emerge as they grow. The bag may be outfitted with a vent to allow carbon dioxide from the air to enter the environment of the plant. With this type of arrangement, the product remains clean and the plants are individually packed when harvested. Furthermore, by providing an appropriate vent of a permeable material insects are prevented from reaching the plants and hence no pesticides are necessary.

A preferred seed package embodiment utilizes bags which are hermetically sealed to the exterior surface of the seed tube. This seed package contains an independent system for supplying a gaseous environment including carbon dioxide to each plant, in accordance with most advantageous growth conditions. This hermetically sealed embodiment has numerous advantages. Besides those mentioned above in connection with the vented bag, this sealed modification is amenable to a special method of packaging. The entire conduit can be flushed with an inert gas, such as nitrogen, to expel oxygen from the interior after the plant has grown. The system is then pressurized to distend the packing bags. While maintaining the pressure within the bags, they are stripped from the seed tube and sealed. The product within the bag is thereby protected against damage by a cushion of pressurized gas during handling and shipping. In addition, the inert gas acts as a preservative since, due to the absence of oxygen, the product will keep for long periods without spoiling.

These and other specific embodiments and advantages accruing thereto will be described in detail below.

In summary then, it is a principal object of the present invention to provide a seed package which incorporates a suitable plant life support material and means for selectively supplying the seeds with water and liquid fertilizer to allow crops to be raised independent of the soil.

A further object of the present invention is to provide a farming method whereby water, plant nurient and gaseous plant food may be administered by automatic means to each individual plant in a uniform manner and at a precisely determined rate conducive to controlling and optimizing plant growth and development rates.

A still further object is to provide a seed package amenable to mechanized planting and harvesting methods and requiring only minimal expenditures of space, water, fertilizer, pesticides, and effort in preparation of planting sites and maintenance during the growth period of the plants.

Still another object of the present invention is to provide means and a method for growing vegetables and produce, into a package, which package may be a gas filled pressurized container to allow mechanical gas cushion protection of its contents as well as chemical preservation to prevent spoiling.

Other objects and advantages will become apparent to those skilled in the art upon consideration of the following description of specific preferred embodiments in conjunction with the drawings, of which:

FIGURE 1 is a longitudinal sectional view through a fragment of a preferred seed tube embodiment of the seed package of the invention;

FIGURE 2 is a lateral cross-sectional view of the seed tube of FIGURE 1;

FIGURE 3 is a side elevational view of a pin especially adapted for anchoring a seed tube of the invention to the ground;

FIGURE 4 is a presepective cut-away view of another preferred embodiment of a seed tube in accordance with the invention;

FIGURE 5 is a longitudinal sectional view of a seed tube showing mature plants therein;

FIGURE 6 is a perspective view of a seed tube of the invention adapted to receive seedlings;

FIGURE 7 is a perspective view of a rack for supporting a plurality of seed tubes in a minimum of space;

FIGURES 8 and 9 are perspective views of a fragment of a seed tube depicting a modification thereof;

FIGURES 10 and 11 are perspective and cross-sectional views, respectively, of another seed package of the invention having enlarged seed compartments; and FIGURES 12 and 13 are prespective and cross-sectional views, respectively, of a seed package of the invention which does not includes a mulch and nutrients in solid form.

As depicted in FIGURES 1 and 2, the seed package of the invention is desirably in the form of an elongated tube 11 having an outer envelope 12. Suitable materials for the construction of the envelope are plastics, particularly thermoplastics such as polyethylene, which are readily seam welded by the application of heat and pressure. By reason of its low cost and amenability for use as a plant life support mulch for other envelopes after the plants have been harvested, water resistant paper, e.g. plastic coated kraft paper is particularly suited as an envelope material.

Contained within the envelope 12, is a suitable plant life support material 13 such as mulch, peat moss, comminuted used envelopes and their contents, etc. Support material 13 includes such conventional fertilizers and plant nutrients as desired for germination and growth of the type of plant to be raised. Seeds 14 of the desired plants are embedded at spaced intervals within the material 13. For ease in handling and inserting in the envelope, each seed 14 is desirably enclosed within a packed body 15 of peat moss or the like. When the packed bodies are wetted by irrigating water, they expand and release the seed so that germination and root growth can take place.

The material filled portions of envelope 12 communicate through spaced apertures 16 with a fluid channel or conduit 17 for carrying water and nutrient or fertilizer suspensions such as solutions of nitrogen, potassium, and phosphorus containing compounds to the seeds and roots of the individual plants. The apertures 16 are directly adjacent each of the seeds 14 so that the water or liquid fertilizer is introduced in the immediate vicinity of each seed. Thus, the quantity of water and liquid fertilizer introduced to each individual seed or growing plant can be controlled to provide optimum growth rates and time of reaching maturity.

Slit-like openings 18 are disposed directly above each of the seeds 14 for the emergence of the growing plant from the envelope. Prior to planting and sprouting of the seeds, the apertures may be suitably closed such as by means of an adhesive tape which can be readily removed when the seeds are beginning to grow. Alternatively, apertures 18 may be temporarily closed by means of a water soluble glue which will dissolve when irrigation of the seeds commences. The envelope also may be weakened adjacent each of apertures 18, such as by providing dotted perforation, so that a seedling can enlarge the aperture as it grows.

The spacing between successive seeds is determined by the diameter of the mature plants to allow maximum utilization of available space without crowding the plants too closely together. The diameter of the tube is dependent on the size of the root system developed by the fully grown plant and the total quantity of life support material.

As depicted in FIGURE 2, tube 11 can be formed of one strip of material which has been rolled upon itself to provide both the envelope 11 and the conduit 17. In the construction of this embodiment, the conduit 17 can first be formed such as by rolling one end of the strip of material over a rod-like mandrel and heat sealing the joining portions. Then the life support material 13 can be placed along the strip and the strip rolled upon itself and joined to the bottom end of conduit 17 by heat to provide the envelope 11 enclosing material 13. Both aperture 18 through the envelope and aperture 16 into the liquid conduit at each seed location can be provided simultaneously. One needle can be passed through the envelope to form aperture 18 and through the conduit wall to form the aperture 16. Then the seed, suitably packed in a peat moss cylinder, can be inserted through the aperture 18 into the tube.

It is to be noted that the strip of material forming the tube 11 extends laterally beyond the tube to provide a flange 21 along the length of the tube. This flange is provided with spaced apertures 22 for suitably securing the tube to the ground or other support structure.

As was mentioned previously, the growth of plants in the seed package of the invention is independent of the soil. As a practical matter, however, the seed tubes are frequently simply laid down in rows on top of a level plot. Since the plant should preferably grow vertically from the seed tube, and since the seed tube alone provides insufficient stability, it should be anchored to the ground. Simple pins 23 inserted through the apertures 22 and into the ground have been found to lend sufficient stability for small to medium sized plants. However, in cases where the plants carried by the tube are exceedingly top heavy, e.g., cabbage, or sufficiently tall to be affected by wind, it is necessary to provide a sturdier anchoring means. Such a heavy duty anchoring means is shown in FIGURE 3 and comprises a pin 24 provided with a transverse bracket 26 conforming to the contour of the seed tube and which has a downwardly projecting end section 27 to be jammed into the soil on the side of the seed tube opposite the flange 21. The other end of the pin is provided with a downwardly projecting portion 28 for insertion through the apertures 22 in the ground. An additional feature which provides stability are the spring loaded barbs 29 on the portion 28. These barbs are released when slip ring 31 is disengaged therefrom upon insertion of the portion 28 into an aperture 22.

It is to be appreciated that the seed tube can have other configurations. For example, as depicted in FIGURE 4, the liquid conduit 32 of the embodiment shown is not within the interior of the envelope 33 but rather, along side of it. Communication between the conduit 32 and the envelope is provided by channels 34 extending therebetween. This embodiment includes material 13 with nutrients, seeds 14 and the other features of the invention in similar respects to the earlier described embodiment.

The simplicity with which this embodiment can be fabricated should be apparent. A strip of thermoplastic material or thermoplastic coated material can be longitudinally folded over a rod-like mandrel and heat sealed together to form conduit 32. The heat sealed junction should be intermittently interrupted along its length to provide channels 34. The material 13 can thereafter be placed between the two layers of the strip and the two layers joined at their edges. Seeds and apertures therefor can be provided in the resulting envelope in the same manner in which they are provided in the embodiment of FIGURES 1 and 2.

After the seed tubes of either embodiment are manufactured, they are conveniently stored in coils or wound on reels. If the seed tube is to be anchored on the ground, it is "planted" simply by unwinding the tube from a spool mounted on a suitable moving conveyance. The tube may be positioned and guided by a rotary guide wheel engaging the pin apertures by means of sprockets, for example. The pins may be inserted and driven into the ground simultaneously. An alternative method is to punch the pin apertures "in situ" by means of a sharp rotary tool, or simply utilizing pins with a sharp point and driving the pins through the laterally projecting flanges. Individual rows of the seed tubes are connected, preferably in parallel, to a central water supply and associated facilities for introducing nutrients and other additives. After the plants have reached maturity, they are harvested by lifting the seed tubes from the ground. The crop plants can be separated from the seed tubes by passing the tube past a set of knives, for example. To the extent that the seed tubes are made of a thermoplastic or similar material, they may be reclaimed and reprocessed or comminuted for mulch. In the case of paper tubes the spent tubes can be simply shredded to be utilized as mulch.

FIGURE 5 shows a seed tube with grown plants 36. The root network 37 is seen to pervade the material within the seed tube.

In some instances, it is desirable to germinate a seed and start plant growth under hothouse conditions, and then transfer the resulting seedling to the outdoors. As is depicted in FIGURE 6, the invention may be adapted to receive such seedlings. More particularly, the seed package 38 is provided with relatively large apertures 39 into which the seedlings 40 can be inserted. The roots and surrounding life support material of the seedlings is enclosed in a wrapping 41 of a material such as paper mesh, which will deteriorate to allow the roots to branch out into the life support material in the tube.

As mentioned before, since the seed package of the invention dispense with the necessity of relying on the ground, the tubes can be placed in any convenient location. FIGURE 7 depicts a plurality of short lengths of tube supported on a rack 42. This rack consists mainly of horizontal trough-like seed tube supports 43 which are fastened to "A" frame support members 44. The separation between individual troughs 43 is adjusted in accordance with the size of the plants. The rack is particularly suited to space limited locations such as in green or hot houses to enhance the yield per unit area. It should be noted that if desired the rack can be provided with wheels to permit the transference of the plants from a hothouse to the outdoors after seed germination.

FIGURES 8 and 9 illustrate a modification of the seed package in which a seed tube is in combination with plant enclosures such as bag-like attachments 46 placed over slits 47 through which the plants emerge. The bags are made of a transparent material, such as clear plastic or cellophane to admit light to the plant. The bag is loosely folded and attached to the seed tube, e.g., by gluing along the edges 48. As the seedling pushes upward, the bag readily unfolds. FIGURE 9 shows the bag in distended form. Screened opening 49 is provided to admit carbon dioxide from the air, but keep out insects.

In a preferred embodiment the bag is completely closed to seal the plant from the outside atmosphere. The plants are provided with a controlled carbon dioxide enriched gas environment preferably through a separate gas channel (not shown) through the tube and which communicates with each bag. If the mulch packing within tubes is sufficiently loose, though, and the seed tube sections are not too long, the carbon dioxide may be diffused through the plant support material. However, this method is applicable only with plants which are compatible with the saturated carbonic acid condition which is apt to be established in the moist material.

On the average, plants grown under isolated conditions require not nearly as extensive pesticide treatment as plants exposed to insects. However, some treatment with chemicals for other disorders sometimes remains necessary or is desirable. In such instances, the chemicals can be introduced to the plants through the channel provided for the controlled carbon dioxide atmosphere. The sealed bag embodiment saves chemicals and prevents contamination of the environment with them.

When the crop is harvested, the individual plants are separated from the tube together with the bag, the bag is closed and the clean, fresh produce is shipped and marketed in the bag enclosure.

The sealed bag embodiment also allows enhancement of the freshness of the plants and minimizes damage during handling and shipping. The gaseous environment employed during growth can be replaced with an inert gas, which also may include preservatives. Furthermore, the gas may be pressurized to expand the bag to a larger volume than its produce contents, thereby providing an air cushion and protection from damage.

FIGURES 10 and 11 illustrate a seed package in accordance with the invention which is particularly well suited to growing large and heavy plants with large root structures, as well as bulbous or the like plants which are grown primarily for their roots, e.g., beets. In this embodiment, the seed package differs from the seed tubes discussed previously in that the envelope in which the seeds are disposed is a plurality of generally rectangular bag compartments 51 which project laterally from a central liquid conduit or tube 52. The bags 51 comprise outer coverings 53 of plastic or paper sealed to the conduit 52 along the edges 54. Plant life support material 56 is provided within the bag compartments to nourish the seeds 57. Central conduit 52 carries water and liquid fertilizers for introduction to each compartment through apertures 55 in the tube. Slit-like perforations 58 are provided in the top surfaces of the coverings to permit emergence of the growing plants. These perforations can be suitably sealed in a manner similar to the manner in which the perforations in the earlier described seed tubes are sealed.

It is to be noted that the bags 51 alternately project to the right and left from conduit 52. Besides enhancing the stability of the seed packages, this results in a staggered planting pattern and a consequent greater utilization of space. If desired, the individual compartments can be provided with folds or the like, such as in the vertical sides 59, to permit the bag to expand with the growth of the roots.

In the embodiments discussed above, the seeds are generally embedded in a plant life support material comprising peat moss or similar material, together with solid plant nutrients, which provide the bulk of the required materials to sustain plant growth. Plant nutrition is further augmented by plant foods dissolved and/or suspended in the water and supplied to the plants through the irrigating system. It should be noted, however, that the quantity of plant foods supplied with the water may be significantly enhanced in any of the above examples.

The seed package illustrated in FIGURES 12 and 13 is especially adapted for nourishing plants with liquid life support materials excusively. The package is a tape 61 comprising upper and lower water impermeable plastic or paper sheets which are joined together in face to face relation to define a fluid channel 62 having spaced enlarged seed chambers 63.

The seed chambers 63 contain seeds 64 resting upon pads of a natural or synthetic porous material 66, such as an open cellular plastic foam. Fertilizer brine is pumped through the fluid channels and the foam to nourish the sprouting seeds. The foam pad supports the plant and distributes the root structure of the seed, but is completely insert so far as plant growth is concerned.

It may be desired to depart from the self-sufficient agricultural method set forth above and utilize the soil to some extent in raising the crops to maturity. This may be done, for example, in growing plants which develop large bulbous or tap roots or if it is advantageous to maintain the dimensions of the seed package at a minimum. To do so, a weakened portion is provided at the bottom of the tube or bag compartments by means of pinhole perforations or the like. The main contribution to the nourishment is, however, still derived from the seed tube which continues to locally irrigate each plant with fertilizer solution. After the roots forceably expand the perforation and enter the surrounding soil, the liquid conduit also supplies water and fertilizer to this soil for the plants.

What is claimed is:

1. A seed package for growing and harvesting a crop comprising an outer substantially closed elongated envelope of a durable, water impermeable and flexible material and adapted to contain seeds at spaced locations, a plant life support material including plant nutrients contained within said envelope, said envelope being adapted adjacent each of the seed locations to allow the emergence of a plant growing from the seed thereat, and a liquid conduit of a durable, liquid impermeable and flexible material within with said envelope and apertured generally at said seed locations for carrying a controlled amount of water and plant nutrients to each of said seeds.

2. The seed package of claim 1 wherein said envelope defines an elongated tubular enclosure and said seeds are spaced longitudinally within said enclosure.

3. The seed package of claim 2 wherein said liquid conduit extends longitudinally thereof.

4. The seed package of claim 1, further including a plurality of plant enclosures of a transparent material secured to said envelope, each of said enclosures circumscribing a location of said envelope at which a growing plant will emerge whereby said plant will grow into said enclosure.

5. The seed package of claim 4 wherein said enclosures are substantially hermetically sealed and are provided with a controlled gaseous atmosphere for sustaining the growth of said plants.

6. A seed package for growing and harvesting a crop comprising an outer envelope of a durable, water impermeable and flexible material, a liquid pervious plant life support material including plant nutrients within said envelope for sustaining the growth of plants, said envelope being adapted to spaced locations to allow extension therethrough of a plant, and a liquid conduit of a durable, liquid impermeable and flexible material communicating with said envelope generally adjacent said locations for carrying controlled amounts of water and plant nutrients to each of said seeds.

7. The seed package of claim 6 wherein said liquid conduit extends longitudinally of said enclosure exteriorly thereof and communicates with said enclosure through transverse channels.

References Cited

UNITED STATES PATENTS

| 2,072,185 | 3/1937 | Schein | 47—34.13 |
| 2,346,029 | 4/1944 | Jennings | 47—38.1 |
| 3,172,234 | 3/1965 | Eavis | 47—1.2 |
| 2,798,768 | 7/1957 | Babin. | |

FOREIGN PATENTS 23,956/25  7/1926  Australia.

ROBERT E. BAGWILL, *Primary Examiner.*